United States Patent [19]

Wiggin

[11] 4,133,605
[45] Jan. 9, 1979

[54] PREVIEW AND PROJECTION SYSTEM FOR SLIDES STORED IN SPACED, CO-PLANAR RELATION IN A PLANAR HOLDER

[76] Inventor: Blanton C. Wiggin, 144 Forest St., Wellesley, Mass. 02181

[21] Appl. No.: 700,739

[22] Filed: Jun. 29, 1976

[51] Int. Cl.² .................. G03B 21/132; G03B 21/28; G03B 23/08
[52] U.S. Cl. .................................. 353/21; 353/27 R; 353/108; 353/120; 353/DIG. 3; 353/DIG. 5
[58] Field of Search ................. 353/27 R, 95, 96, 103, 353/108, 120, DIG. 3, DIG. 5, 21; 350/16

[56] References Cited

U.S. PATENT DOCUMENTS

| | | | |
|---|---|---|---|
| 2,250,174 | 7/1941 | Bancroft | 353/45 |
| 2,534,561 | 12/1950 | Silver | 353/27 R |
| 2,811,892 | 11/1957 | Holloway | 353/DIG. 3 |
| 3,457,007 | 7/1969 | Conroy | 353/88 |
| 3,466,126 | 9/1969 | Sakamoto | 353/108 |
| 3,759,487 | 9/1973 | Badalich | 353/21 |
| 3,807,850 | 4/1974 | Ozeki | 353/23 |
| 3,871,759 | 3/1975 | Crew | 353/DIG. 3 |

*Primary Examiner*—Steven L. Stephan
*Attorney, Agent, or Firm*—Richard J. Birch

[57] ABSTRACT

A system for previewing and projecting slides that are stored in spaced, co-planar relation in a planar holder is disclosed. The slides are previewed, either individually or in a group, in their natural orientation without removing the slides from the holder. Projection of the slides to form a naturally oriented image also is accomplished without removing the slides from the holder. In the preferred embodiment, means are provided for moving the planar slide holder orthogonally with respect to the optical axis of the projection system. A slide indexing system is provided to allow the projectionist to select a particular slide for projection. The slide indexing system utilizes cooperative means on the slide holder and projector to achieve indexing and, if desired, other control functions. In an alternative embodiment, the projected image plane is vertical and can be rotated about a vertical axis at the projector without moving the base of the projector.

15 Claims, 14 Drawing Figures

PREVIEW AND PROJECTION SYSTEM FOR SLIDES STORED IN SPACED, CO-PLANAR RELATION IN A PLANAR HOLDER

BACKGROUND OF THE INVENTION

The present invention relates to slide projectors in general and, more particularly, to a slide projection system for projecting slides that are stored in space, co-planar relation in a light transmitting, planar holder without removing the slides from the holder during previewing and/or projection of the slide.

The ubiquitous colored slide or "transparency" film is used by both amateur and professional photographers to record various events. The resulting positive slides can be viewed individually in a hand viewer or projected by a slide projector onto a screen. Although positive-to-positive prints can be made from the color transparencies the usual viewing method is by projection. Various systems have been developed over the years for storing and projecting such slides.

Initially, the first simple projectors received the slides upside down, and one-by-one. Subsequent improvements led to a cross-feed system in which the slides were loaded from either side of the projector. Automatic cross-feeds for stacked slides was the next development in the projection art. Later on, magazines or cassette feeds were employed to prove a slide storage medium which operated in conjunction with the projector. Representative examples of various types of slide viewers, projectors and storage units are shown in the following U.S. Pat. Nos.: 2,660,920; 2,779,116; 2,821,037; 2,968,882; 3,462,210; 3,524,703; 3,609,026; and 3,696,538.

At the present time slides are stored in round trays, for either horizontal or vertical use in the projector, in rectangular slide trays and in "cubes". In each case, the slides are stored upside down in the storage tray. Recently, some complicated optical systems have been used to rotate and preview single slides a certain distance ahead of the slide to be projected. In each one of these storage mediums, the slide has to be removed from its holder in order to preview or otherwise inspect the slide. Unless the projectionist knows the contents of his slide tray throughly, he must remove the slide for inspection with a concomitant increase in the probability of deleterious fingerprints and general wear and tear on the slide. Given these mechanical impediments to slide viewing, it is understandable that many people only enjoy their pictures occasionally.

It is accordingly a general object of the present invention to provide a slide projection system in which the slides can be previewed and/or projected without removing the slides from their holder.

It is a specific object of the invention to provide a slide projection system in which the slides can be previewed in their natural orientation and projected to form a naturally oriented image.

It is still another object of the invention to provide a slide projection system with individual and/or group previewing of the slides and random slide selection for projection.

It is a further object of the invention to provide a slide projection system having a slide indexing mechanism that utilizes a cooperative mechanical/electrical relationship between the projection unit and the planar slide holder.

It is a feature of the invention that the projector "feed" is performed with the stored slides in their natural orientation.

It is another feature of the invention that the light transmitting, planar, slide holder can be stored in an album type holder and can be removed from and replaced therein with a minimum of effort.

These objects and other objects and features of the invention will best be understood from a detailed description of a preferred embodiment thereof, selected for purposes of illustration and shown in the accompanying drawings, in which:

FIG. 13 is a view in perspective of still another embodiment of the invention; and, FIG. 14 is a view in side elevation and partial section showing a solenoid actuated locator for the co-planar slide holder illustrated in FIG. 6.

DETAILED DESCRIPTION OF A PREFERRED EMBODIMENT OF THE INVENTION

The preferred embodiment of the slide projection system of the present invention will be described in detail in connection with FIGS. 1-4 of the drawings. However, before turning to the drawings, it will be helpful to define certain terms in order to facilitate an understanding of the invention.

Thus, the following definitions are used in this application:

1. "Projection Axis" — the center of the light path from the light source to the image plane. The axis can be folded as in an overhead projector. Also called the "Z-axis";
2. "X-Axis" — a direction approximately perpendicular to the Z-axis;

3. "Y-Axis" — a direction approximately perpendicular to both the Z and X axes;
4. "W-Axis" — any other direction in a plane formed by the X and Y axes;
5. "Light" — normally visible, but includes for special applications UV and IR;
6. "Slide" — a light transmitting, image bearing discrete element, mounted or unmounted, normally produced photographically as a positive or negative image of an object. Light transmitting original artwork is included herein as a "slide" also called "transparency";
7. "Series" — one after the other, (a) spatially, in which separate slides are approximately perpendicular to a common line (either straight or curved) through the slides or (b) temporally, in which joined images follow one after the other on a straight surface as in a movie film;
8. "Series Storage" — the presently used method of multiple slide storage, for projection front-to-back, flat surfaces together, one after the other.
9. "Parallel Storage" — the storage of slides in a planar X-Y matrix in which the slides are approximately in the same plane in both X and Y axes;
10. "Co-Planar Storage" — all in one plane e.g. parallel storage;
11. "Slide Projector" — popular generic term for a type of transparency projector;
12. "Overhead Projector" — another type of transparency projector;
13. "Group Previewing" — previewing several slides before projection;
14. "Single Slide Previewing" — previewing a single slide so that the projectionist can see the next slide to be projected and reassure himself that it is correctly oriented for projection;
15. "Natural Orientation" — the orientation of the image on the slide or at an image plane which corresponds to the original orientation of the object i.e. the image is erect and right-handed;
16. "Slide Holder" — a common term for commercial plastic pocket sheets presently available for storing slides, and viewing by means of a light box. The term "Slide Holder" should not be confused with the series storage trays or boxes e.g. the round or oblong trays or "cubes".

Turning now to the drawings and in particular to FIGS. 1 through 8 thereof, there is shown a preferred embodiment of a slide previewing and projection system constructed in accordance with the present invention and indicated generally by the reference numeral 10. The major components of the previewing and projection system 10, each of which will be discussed below in detail, are identified and indicated generally by the associated reference numerals as follows: a base or housing 12 having mounted thereon X-Y movable slide holder support 14; a light source assembly 16; movable projection optics 18; and, a support system 20 for the projection optics.

Figure 1:
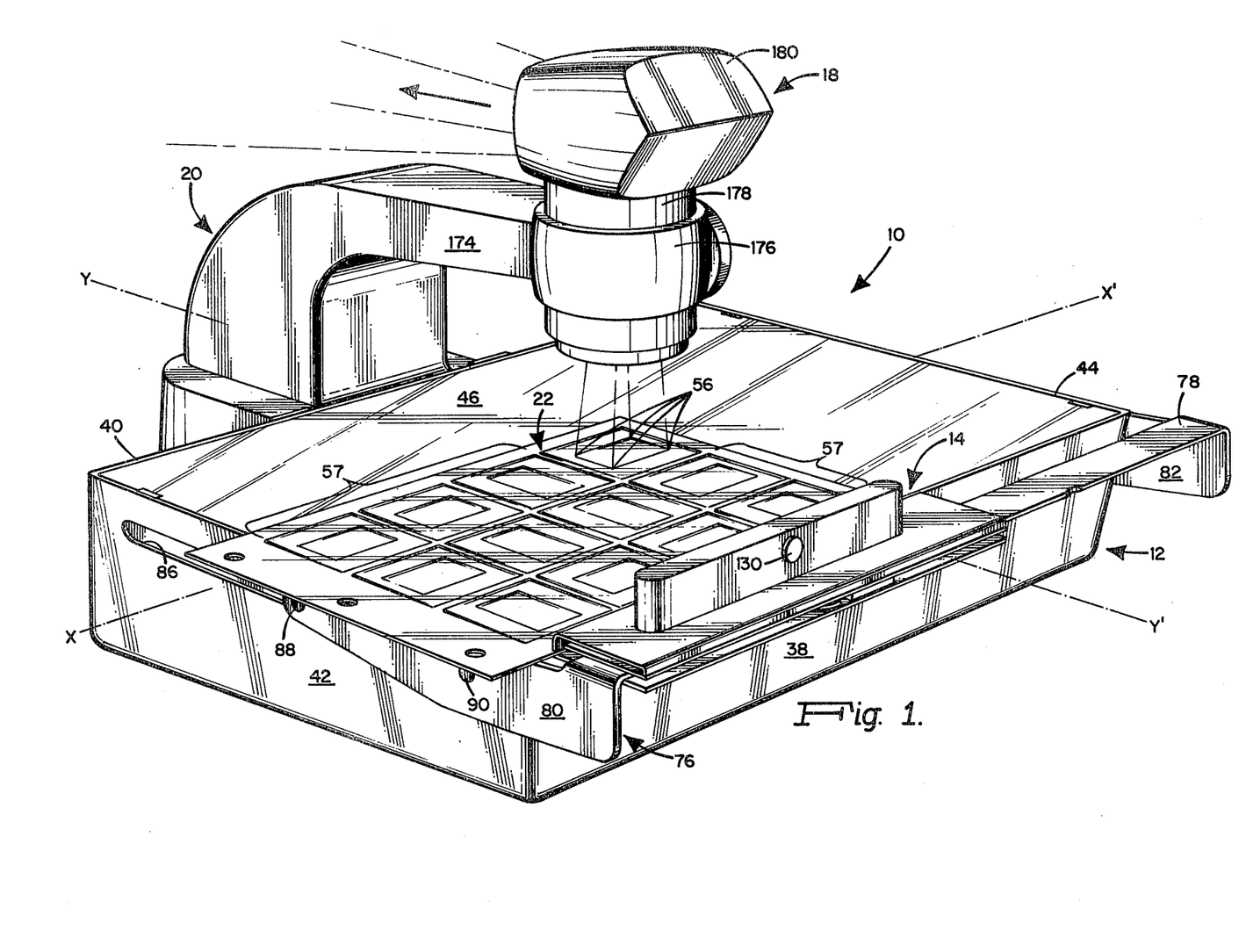
FIG. 1 is a view in perspective of a preferred embodiment of the slide previewing and projector system of the present invention.
Figures 2, 5:
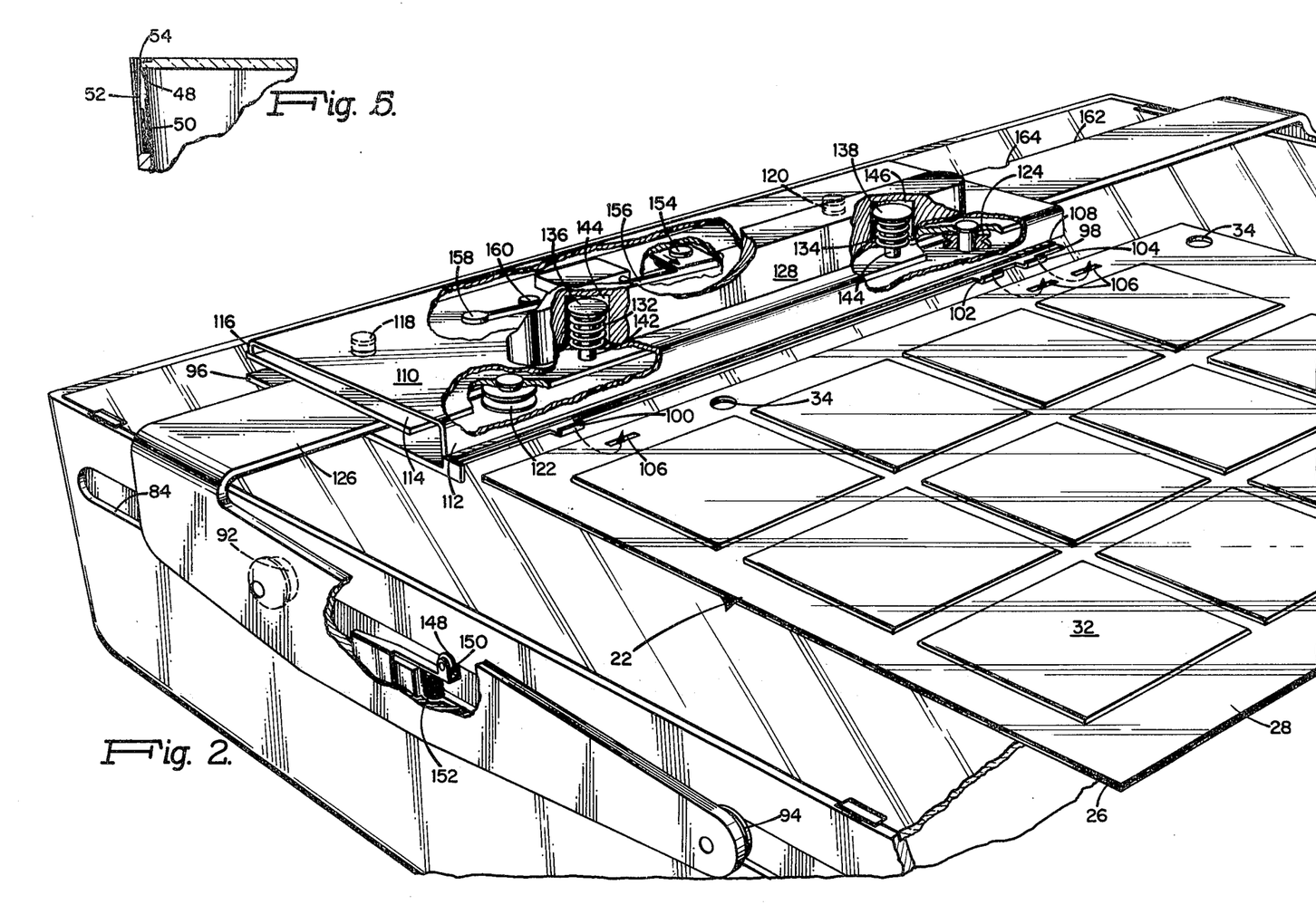
FIG. 2 is a view in perspective, partially broken away, of the X-Y slide holder transport mechanism of the projection system showing a planar, slide holder positioned in the slide holder support previewing panel.
FIG. 5 is a detailed view of the seating and releasable retaining means for the previewing panel shown in FIG. 1.
Figure 6:
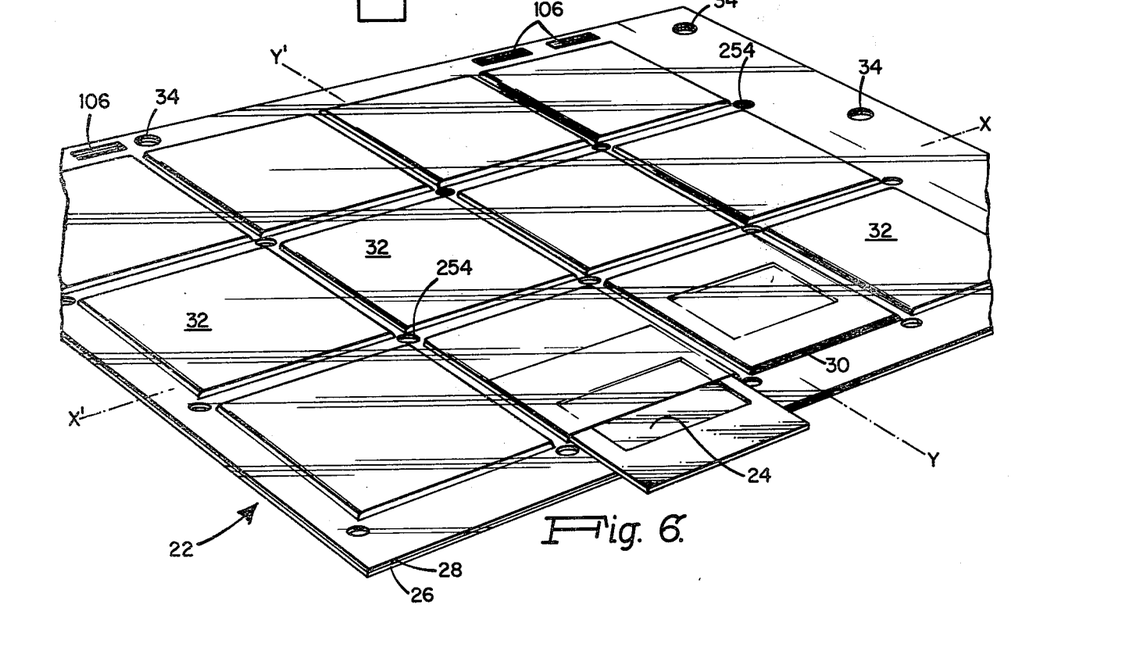
FIG. 6 is a fragmentary perspective view of a co-planar slide holder for use in cooperative relation with the projector depicted in FIG. 1.

Associated with the previewing and projection system 10 and cooperatively operative therewith is a planar slide holder 22 best seen in FIGS. 1, 2, and 6. The slide holder 22 is designed to hold a plurality of slides 24 in spaced, coplanar, relation as shown in FIG. 6. The slide holder preferably comprises a plurality of mated or juxtaposed plastic or other transparent sheets 26 and 28. The lower sheet 26 is of relatively stiff, flat and continuous construction. The upper sheet 28 has spaced, parallel rows of slits 30, and is heat sealed or otherwise adhered to the lower sheet 26 about the sheet peripheries and within the same along the X and Y axes and along the lines parallel thereto.

The resulting coplanar storaging slide holder 22 has a plurality of bi-directionally spaced, coplanarly disposed slide positions or pockets 32 therein within each of which can be stored a mounted or unmounted slide 24. The slide holder 22 is provided with a plurality of apertures 34 which are located along the marginal edges of the slide holder. The spacing between apertures 34 is designed so that the slide holder can be inserted in a conventional ring binder or other type of album for storage.

Although the slide holder 22 illustrated in FIG. 6 contains a plurality of coplanar, bi-directionally spaced slide pockets 32, it will be appreciated that the slide holder may comprise only a single row of slide pockets in either the X or Y directions. In this case the slides 24 would be coplanarly, but not bi-directionally stored.

Assuming that the slides 24 are inserted into the slide pockets 32 on slide holder 22 so that they are naturally oriented with respect to the X and Y axes as follows: the X portion of the X-X' axis is on the left hand side of the slide image, the X' end is the right hand side, the Y of end of the Y-Y' axis is the top and the Y' is on the bottom, and that the slide containing slide holder is positioned on the slide previewing and projection system 10 as shown in FIG. 1, then the operator's position for normal orientation with respect to the slides would be at the Y' end of the Y-Y' axis. Given this relationship, the projection optics 18 will project a naturally oriented image of a slide in a direction indicated by the arrow in FIG. 1. It will be appreciated from the preceding description that, unlike conventional overhead projectors, the projection system 10 of the present invention permits the operator to view both the slide itself and the projected image of the slide in a natural orientation.

Having described the major components of the previewing and projection system of the present invention and their general operation, I will now discuss in detail the specific structure and interrelationship of the major components. The base or housing 12 comprises a flat, generally rectangular tray or box having bottom, front, back, left and right side walls 36, 38, 40, 42 and 44, respectively. Associated with the base 12 is a previewing panel herein comprising a top 46 on the base 12 which top may be of glass or plastic material and frosted or otherwise treated or fabricated to produce the desired light transmitting characteristic.

Selected portions of the top element 46 can be opaque, translucent or transparent depending upon a number of parameters including the size of a projection area within an object plane defined by the surface of top 46, the desired area for previewing, i.e. the number of slides which are illuminated for previewing, and the total area of the top 46. Since the previewing and projection system 10 normally will be used under darkened illumination conditions, preferably only the projection area and the desired previewing area of top 46 should be illuminated with the projection area being transparent and the previewing area being translucent. Given this condition, unwanted glare will not be a problem for the operator.

The previewing panel or top 46 is adapted to receive and support thereon, the coplanar storing slide holder 22 with the slides 24 deposed within the slide pockets 32 arranged in natural orientation with respect to the operator's position at the Y' end of the Y-Y' axis as shown in FIG. 1. The base side walls 42 and 44 may be internally recessed at the top to define a ledge 48 as shown in FIG. 5. The ledge provides a seat or support for the previewing panel 46. In that event, two opposite sides, such as the left and right sides 42 and 44, may further have spaced, vertical, inside recesses 50 in which are mounted and into which may be retracted, spring clips 52. The spring clips 52 releaseably secure or retain the previewing panel 46 by means of their overlying, inwardly bent lips 54, as shown in FIG. 5.

Figures 3, 4:
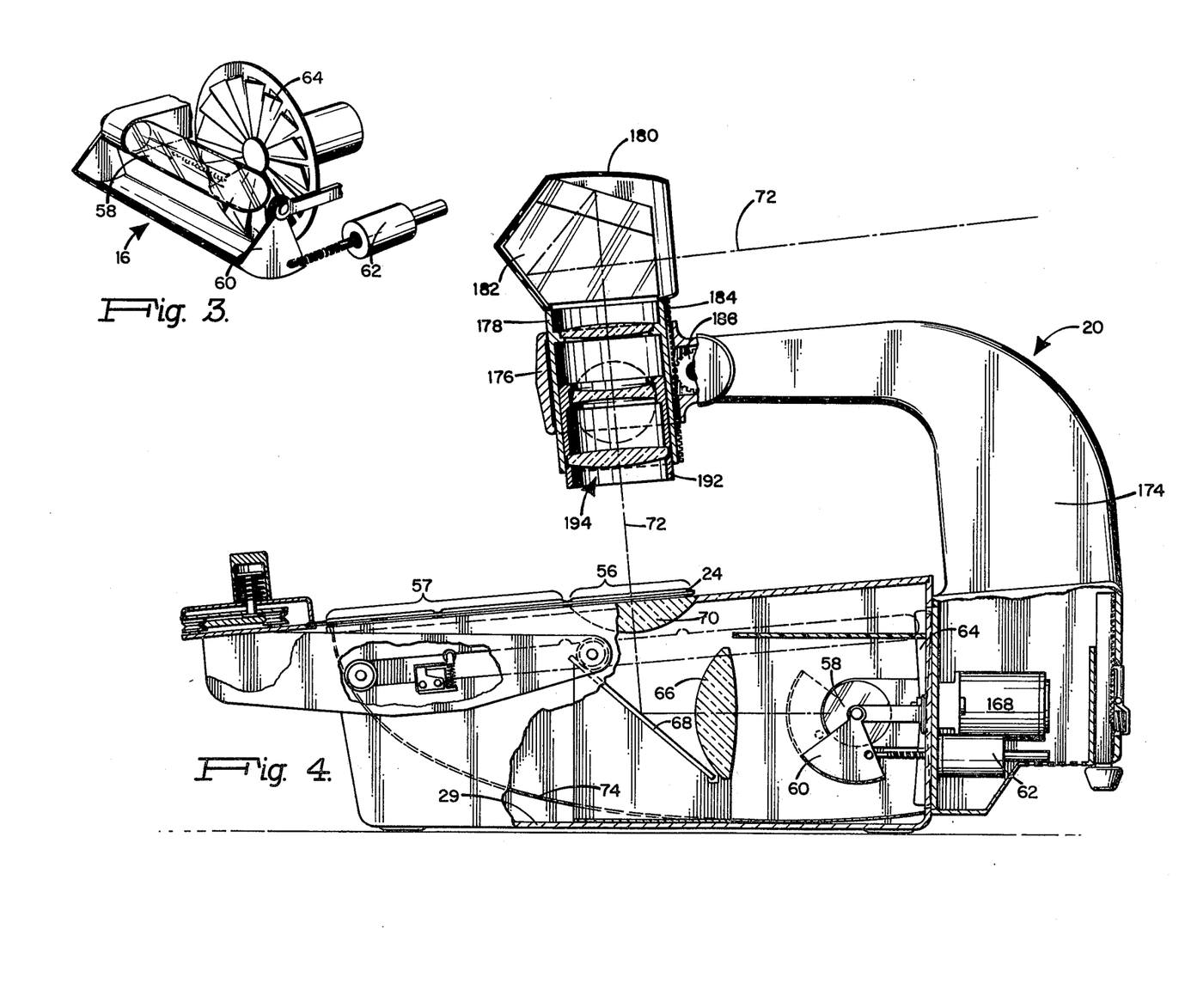
FIG. 3 is a detail view in perspective of light source and shutter portions of the projection unit.
FIG. 4 is a view in side elevation, partially broken away, of the slide previewing and projection system.

With the slide-containing slide holder 22 positioned as shown in FIG. 1, the light source assembly 16 provides illumination for the slide at the projection location indicated by the reference numeral 56 in FIG. 1 and for one or more other slides which are in the slide previewing position 57. Looking at FIGS. 3 and 4, the light source assembly 16 comprises a projection lamp 58, a solenoid actuated lamp shutter 60, a solenoid 62 for selectively actuating the shutter 60 and, if desired, a cooling fan 64. With the shutter in the solid position as shown in FIG. 4, light from lamp 58 is directed by means of condenser 66, mirror 68 and condenser 70 to the slide projection area 56. Condenser 70 may, if desired, be an integral part of the top panel 46. The optical or "Z" axis of the illumination system and the projection optics 18 is shown in FIG. 4 by the dashed line 72.

When the shutter 60 is in the dotted position, as shown in FIG. 4, light from lamp 58 is blocked from the optical path 72. However, light from lamp 58 will illuminate the remaining slides in the previewing position 57. A curved reflector 74 is provided to direct the light from lamp 58 to the slides in the previewing position. The operation and associated control circuits for shutter actuating solenoid 62 will be discussed below. It will be appreciated that separate lamps under separate or combined control can be employed to illuminate the slide in the projection area 56 and the slide(s) in the previewing area 57. The term "light source means" as used herein shall be construed as being generic to single as well as plural lamp configurations.

Obviously, one or more slides can be illuminated in the previewing position by controlling the size i.e. area of the light transmitting previewing area. As shown in FIG. 1, the previewing area 57 covers the area of eleven slides while the projection area covers one slide. If desired, these members can be adjusted for different purposes. For example, it may be desirable only to preview one slide or one may wish to project two adjacent slides at the same time for comparison purposes. In the latter example, the projection optics 18 is desiged to have a sufficient field of view to accommodate the area of two adjacent slides.

In the embodiment depicted in FIGS. 1-8, the slide holder 22 is incremented in the X and Y directions by means of the Y-Y movable slide holder support 14. The slide holder support 14 comprises a metal or other rigid, light-weight yoke 76 having a back 78 extending over the base 12 in parallelism with and in proximity to its front wall 38. Yoke 76 has, integrally dependent from its back 78, sides 80 and 82, herein formed by bending the yoke 76, as it extends outwardly over and beyond the base side walls 42 and 44, downwardly from the horizontal to the vertical plane. The yoke sides 80 and 82 thus extend along the outside of and in parallelism with, the base left and right sides 42 and 44 and rearwardly toward the back wall 40 a distance to afford a stable support for the yoke 76 at sufficiently spaced, front-to-back points, and to allow front-to-back centering of all of the rows of slides in slide holder 22.

Means are provided for coupling the yoke sides or arms 80 and 82 to the base sides 42 and 44 in order to provide a stable yoke support and for shifting or reciprocating the yoke in the Y-Y' directions. The coupling means herein comprises base side grooves 84 and 86 which receive yoke arm mounted roller pairs 88, 90 and 92, 94.

The slide holder X-Y positioning means 14 further comprises means for releasably engaging the slide holder 22, herein comprising a lower plate 96 extending under the yoke back 78 and lengthwise thereof as shown. The lower plate 96 has at the front, a step-down or reduced margin or ledge 98 for receiving one edge or margin of the slide holder 22.

The lower plate 96 also has, projecting forwardly and upwardly from ledge 98, laterally spaced, single and double or otherwise keyed retaining and positioning tabs or hooks 100, 102 and 104 for receiption in mating slots 106 of the slide holder 22. The length of the hooks 100-104 and the spacing inwardly of the slots 106 from the slide holder margin or edge is designed to butt the edge of the slide holder against the back 108 of the lower plate edge 98.

It will be appreciated that the slide holder slots 106 can be employed for mounting the slide holder in a suitable album. The slots can be used either alone or in combination with the previously mentioned marginal slide holder apertures 34. Preferably, the slide holder slots 106 should serve the dual function of providing a means for engagement with the X-Y movable slide holder support means 14 and for binding the slide holder in an album.

The slide holder 22 is releasably engaged or clamped by a means comprising upper plate 110 which extends over the yoke back 78 in juxtaposition to the lower plate 96. At the front, upper plate 110 has a downwardly turned margin or lip 112 overlying the lower plate edge 98 and arranged to engage and grip the margin of the slide holder 20 when the holder is received on ledge 98. In this position, the lip 112 when downwardly urged, retains the slide holder 22 against the upward lifting thereof from ledge 98 that is required for its separation from the tabs or hooks 100-104.

Means are provided for shifting or reciprocating the upper and lower plates 96 and 110, respectively, and with them the slide holder 22 in the X direction, said means herein comprising intermediate plate 114 which overlies back 40 in correspondence with the upper plate 110, and arranged also to be hingedly engaged by the upper plate at an outer or front margin, downturned lip 116 thereof. Intermediate plate 114 is pinned to the lower plate 96, as at 118 and 120 in FIG. 2, and is fitted additionally with means, herein the dependent, laterally or lengthwise spaced, vertical-axis centrally grooved rollers 122 and 124 for tracking the same in the X direction of slide holder movement, along and against the rear margin 126 of yoke back 78.

Means also are provided for manually manipulating or reciprocating yoke 76 in the Y direction and the previously described slide holder clamping means in the X direction. The resulting longitudinal movement of the slide holder 22 relative to the previewing panel and projection area permits the operator to center a desired slide within the projection area 56. The manual control or manipulating means for the X-Y movable slide holder support herein comprises a finger-engageable bar or handle 128 mounted on upper plate 110 and, mounting in turn, a normally closed, finger-engageable, circuit breaking switch 130.

The upper plate 110 is normally biased downwardly against ledge 98 or against the slide holder 22 received thereon, by springs 132 and 134 which are compressed between the upper plate 110 and retaining caps 136 and 138 of pins 140 and 142. These two pins are anchored in the intermediate plate 114 with the pins above the plate, the springs 132, 134 and the caps 136 and 138 being conveniently enclosed within housing recesses 144 and 146 in handle 128.

By pulling or pressing handle 128 toward the base front 38, the operator may pivot the upper plate 110 upwardly on front bearing lip 116, thereby overcoming the force of springs 132, 134 and raising the clamping lip 112 to disengage the slide storage holder 22. The slide storage holder 22 can then be removed from the bottom plate 96, seating ledge 98, back stop 108 and from the retaining tongues or hooks 100, 102 and 104.

Although the preceding description has been limited to the X direction movement of the slide holder clamping means and the Y direction movement of the reciprocating yoke, it should be understood that the component movements can be reversed with the slide holder clamping means being mounted along the sides of the base to provide movement in the Y direction and the yoke being mounted with respect to the base to provide X direction movement. Other mechanical arrangements are of course possible to achieve the desired orthogonal movement of the slide holder.

Means are provided for signaling to the operator single-slide increments of travel or indexing in both the X and Y directions. The signaling means herein comprises for the Y direction, recesses 148 in one slide groove 84 and a detent 150 pivotably between rollers 88 and 90 on side 44 and biased against the edge of groove 84 and into the recesses 148 by spring 152. The relative location of the recesses 148 and detent 150 is such that detent 150 is engaged in one of the recesses 148 for each front-to-back centering of one of the slide pockets 32 in the Y direction of movement. The greater-than-normal pushing or pulling pressure on handle 128 is needed to force detent 150 out of recess 148 is readily sensed by the operator.

Means are provided for similarly signaling to the operator the centering or projection area positioning of a selected one of the slides 24 in the X direction of slide holder movement. The X direction signaling means herein comprises detent 154 carried by spring 156 mounted at post 158 on the intermediate plate 114 and biased by bearing pin 160 against the yoke back 78, front edge 162 and also into recesses 164 formed therein. The latter recesses are spaced along the yoke back 78 so that the springing thereinto of detent 154 signals the centering of each one of the slides 24 laterally or transversely of the optical path 72 at the projection area 56 in the X direction of movement of the slide holder 22.

It will be appreciated from the preceding description of the X and Y axis movement of the slide holder 22 that the slides stored therein can be moved into the projection area 56 for projection in both a predetermined as well as a random sequence. Since the slides are visible and naturally oriented to the operator in the previewing area 57, the operator can rapidly select a particular slide and move that slide into the projection area 56 by means of the X-Y movable slide holder support 14.

It has been mention previously that the solenoid actuated shutter 60 can be moved from a slide projection position, as shown by the solid lines in FIG. 4, to a light path blocking position, as shown by the dashed lines in FIG. 4. In the latter position, light from lamp 58 is blocked from reaching the slide in the slide projection position 56. However, at the same time illumination is provided for the slides in the slide previewing area 76.

Figures 7, 8:
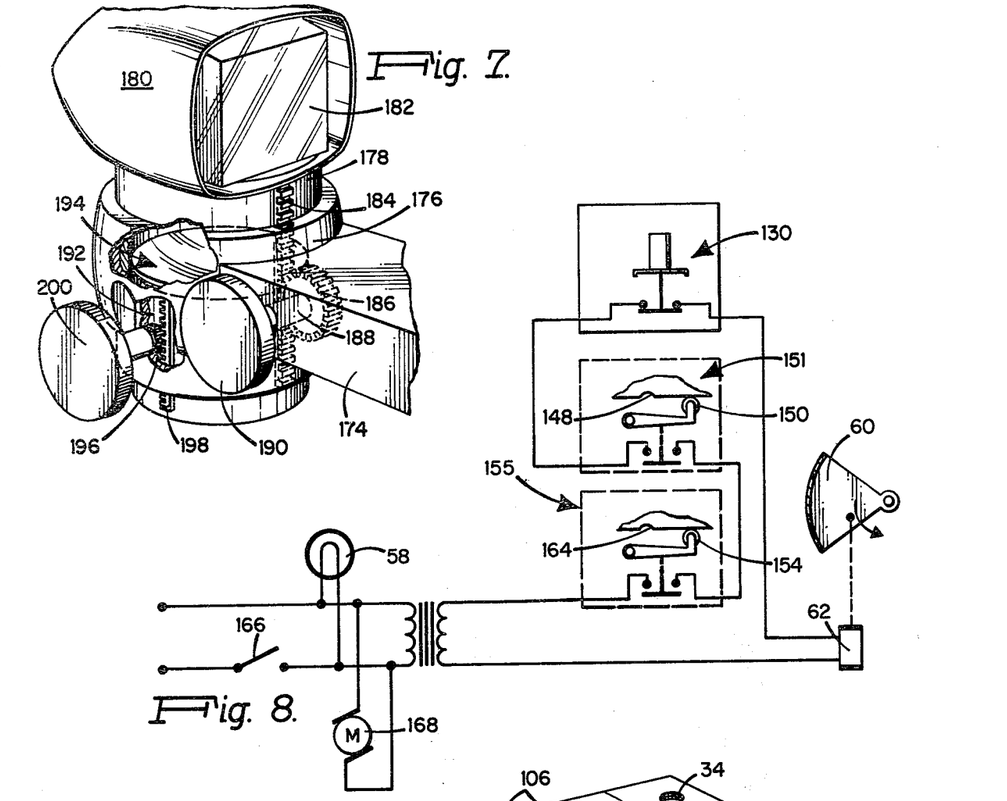
FIG. 7 is a detailed view in perspective, partially broken away, showing the prejection head assembly and focusing system of the projection unit illustrated in FIG. 1.
FIG. 8 is a schematic diagram of the projector control circuit.

Means may further be provided in the preferred embodiment of the invention for automatically controlling the positioning of the lamp shutter 60 by solenoid 62 in correlation with the centering of a slide or slides with the projection area 56. The automatic shutter controlling means comprises, as shown in FIG. 8, a master ON-OFF switch 166, the closing of which energizes projection lamp 58 and fan motor 168 and detent actuating switches 151 and 155 which are series wired with the secondary of transformer 170 and the shutter actuating solenoid 62. When a slide is centered in the projection area 56, detent switches 151 and 155 are closed thereby energizing shutter solenoid 62. When solenoid 62 is energized, the shutter is moved to the solid position as shown in FIG. 4 to permit light from projection lamp 58 to illuminate the slide in projection area 56. An override control for solenoid 62 is provided in the secondary circuit of transformer 70 by means of a normally closed push-button switch 172 which is wired in series with the series connected detent switches 151 and 155.

Having described the slide holder, slide holder movement mechanism and illumination system of the slide previewing and projection system of the present invention, I will now describe the projection optics of the preferred embodiment. It has been mentioned before that the slides are stored in the slide holder 22 in a natural orientation and that, when the slide holder 22 is positioned with the slides in a natural orientation for an operator positioned at the Y' end of the Y-Y' axis, the projection optics 18 permit the operator to view a naturally oriented image of the projected slide at an image plane in the direction shown by the arrow in FIG. 1.

Generally, in accordance with the invention, the projection optics 18 comprises a system of prisms and/or mirrors constructed and arranged to project a naturally oriented image of a slide at projection area 56 when the slide is naturally oriented to an operator at the Y' end of the Y-Y' axis. As shown herein, the projection optics 18 are supported by means of the previously mentioned support system 20. The support system 20 comprises an arm 174 extending upwardly and forwardly of the rear of base 12 to a vertical, tubular extremity 176 which receives a sleeve 178 that mounts a hood or housing 180 within which is positioned a prismatic assembly 182 e.g. a penta-roof prism or a fixed three mirror system for redirecting the optical path 72 from a generally vertical position to a generally horizontal position, as best seen in FIGS. 1 and 4.

Means are provided for vertical adjustment of the position of sleeve 178, within tubular extremity 176, and with it of prismatic assembly 182, comprising a rack 184 on sleeve 178 and meshing gear 186 on shaft 188 having rotatable bearing support through arm 174 for rotary control or manipulation thereof, and thereby of rack 184 and sleeve 178, by externally mounted shaft control knob 190.

Within sleeve 178 is a lens tube 192 mounting a suitable single or compound lens system 194 that is vertically adjusted or focused in turn by gear 196 engaging a tube-carried rack 198 and journaled through arm 174, extremity 176 for its rotary manipulation by knob 200.

Figures 9, 10:
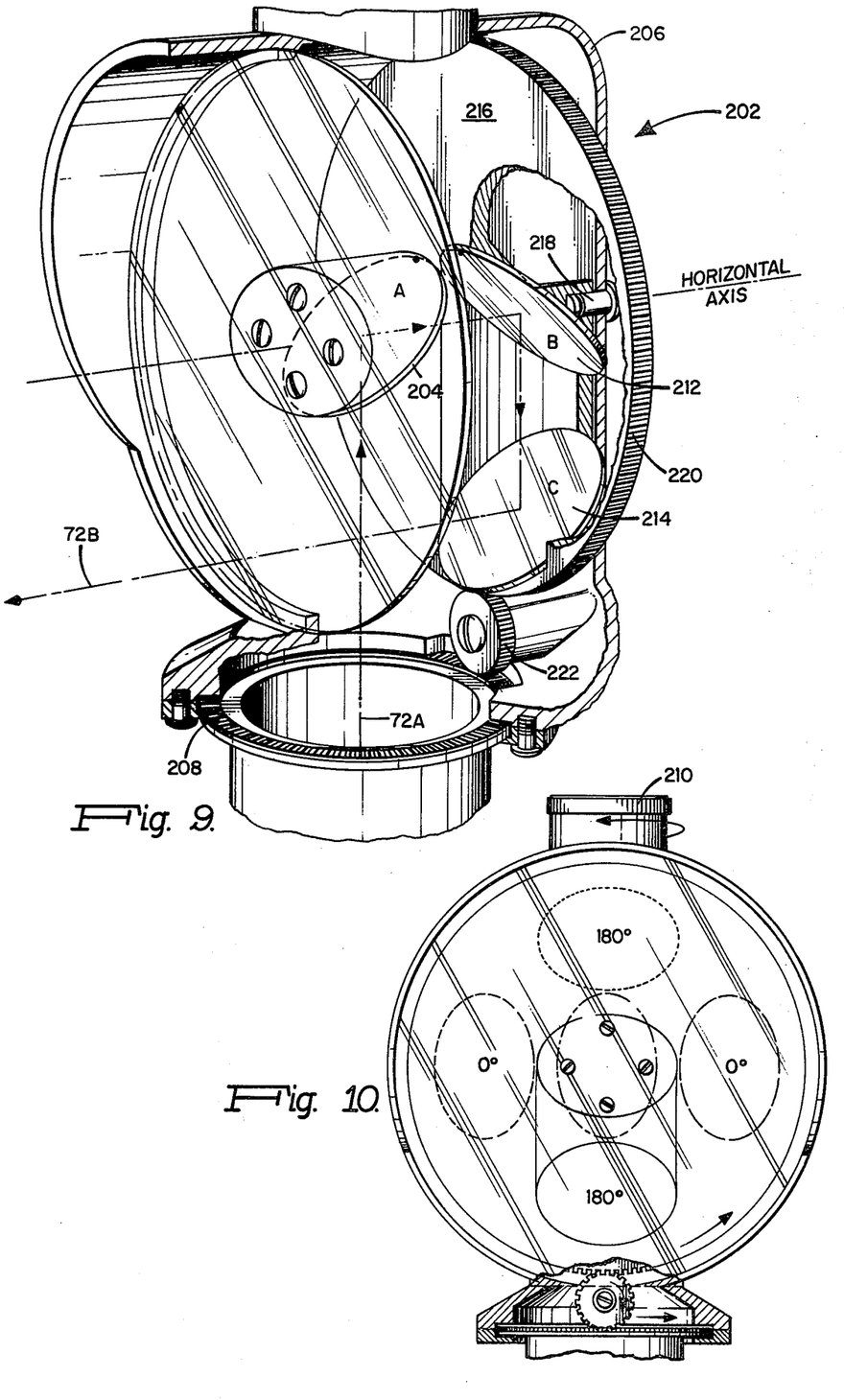
FIG. 9 is a view in perspective, partially broken away, of another embodiment of the projection head assembly.
FIG. 10 is a view in side elevation of the projection head assembly of FIG. 9.
Figure 11:
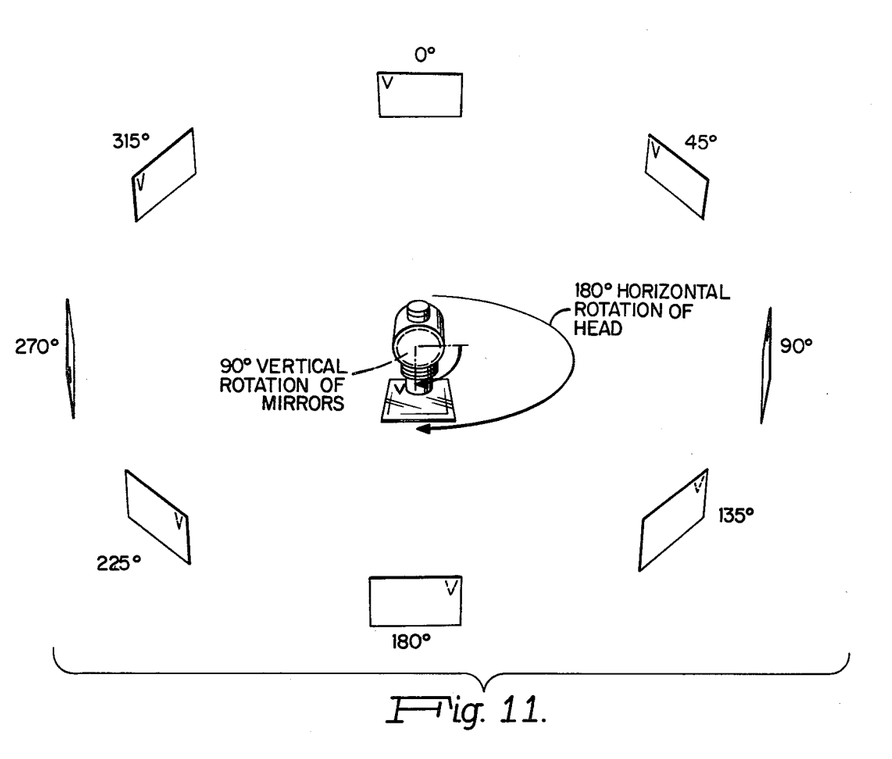
FIG. 11 is a diagrammatic view illustrating the omni-directional projection capability of the projection head assembly shown in FIGS. 9 and 10.

Referring now to FIGS. 9-11 there is shown another embodiment of the projection optics portion of the present invention which utilizes a movable three mirror system in place of the penta-roof prism 182. The FIGS. 9 through 11 embodiment comprises a mirror system 202 having a first mirror 204 fixedly mounted within a head 206 that is rotated around a circular track 208 by means of a manipulating or rotating knob 210. Second and third mirrors 212 and 214 are supported on a mount 216 which is arranged within head 206 for swiveling, as at pivot bearing 218, about the horizontal axis with the second mirror 212 being centered on the axis.

It can be seen from an inspection of FIG. 9 that the second and third mirrors 212 and 214, respectively, are right-angularly related, and oriented 45° to the horizontal axis. Given this geometric configuration, the two-mirrors functionally combine to redirect the vertical light beam 72A through successive right angles to form the ultimate horizontal light beam 72B. Means such as, toothed perimeter 220 and idler 222, are provided for rotating the mirror mount 216 in conjunction with the aforesaid rotation of projection head 206 by means of knob 210.

Referring now to FIGS. 10 and 11, as the head 206 rotates through 360°, the third mirror 214 swings about the horizontal axis and therefore the axis of the fixed first mirror 204 and the pivot bearing 218. The gearing ratio of gears 208, 222 and 224 is designed so that rotation of the mount 216 occurs at a rate of one-half that of the head 206. With this gearing ratio, it will be apparent that for a head rotation of 180° with a concomitant redirection of the projected image by 180°, a rotation of 90° by the mirror pair 212, 214 preserves the natural orientation of the projected image.

The circular track 208 is centered on and transverse to the vertical portion 72A of the optical path. The first mirror 204 is positioned within head 206 so that it too is centered to rotate with head 206 about the vertical portion 72B of the optical path.

The rigidly coupled second and third mirrors 212 and 214 are mounted within the head to rotate about the horizontal axis as explained above. The first mirror thus directs the vertical light beam 72A to the second mirror 212 which in turn redirects the light beam to the third mirror 214 which then directs the light beam along the horizontal path 72B. It will be appreciated that with mirrors 212 and 214 double-rotating the projected image at half the angular rate of rotation of head 206, the operation of the FIGS. 9-11 embodiment of the projection optics is to effect a horizontal projection of a naturally oriented image throughout 360° of rotation of the projection optics head 206 about the vertical optical path 72A.

Figure 12:
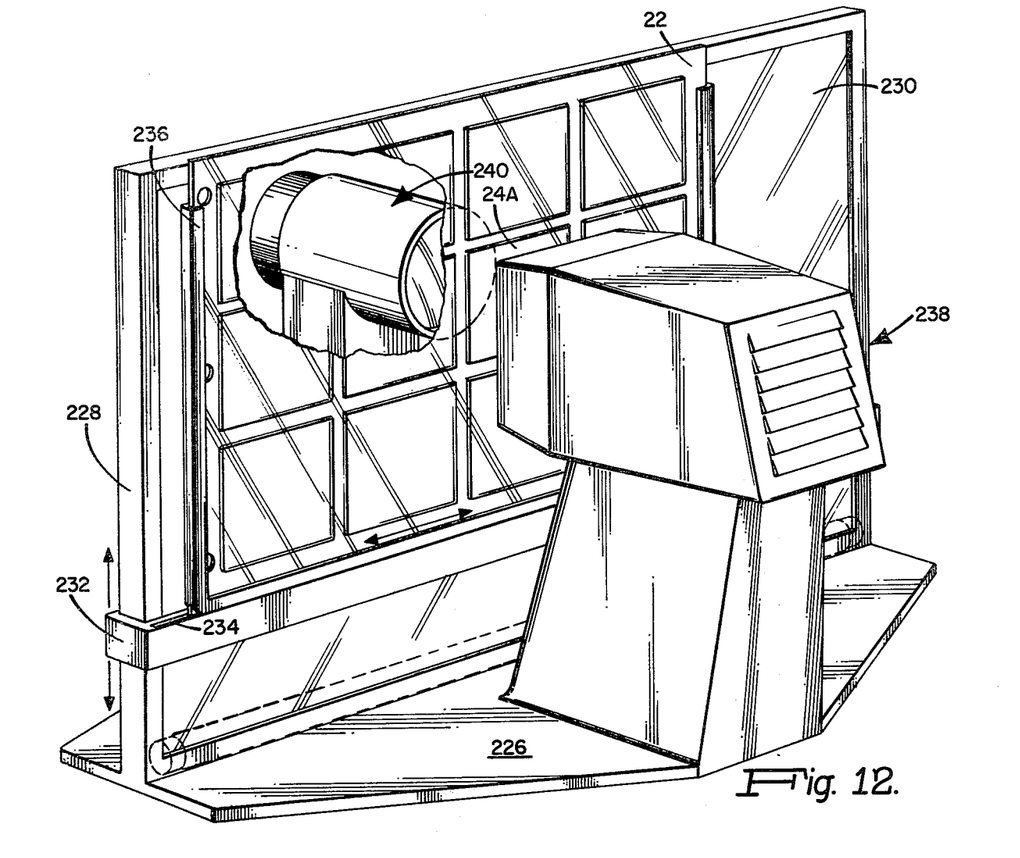
FIG. 12 is a view in perspective of another embodiment of the invention.

Referring now to FIG. 12 there is shown another embodiment of the slide previewing and projection system of the present invention. The FIG. 12 embodiment comprises a base member 226 upon which is mounted a vertically extending frame 228 within which is contained an illuminated previewing panel 230. Slidably mounted on the frame 228 is a vertically movable supporting tray 232 having a channel 234 formed therein. The tray channel 234 extends substantially across the full width of tray 232 and functions as a support and guide means for a slide holder support 236 which is slidably mounted within the channel 234. As shown by the arrows in FIG. 12, the slide holder support is movabe in a horizontal direction parallel to the axis of the support tray 232. The slide holder support 236 releasably holds the previously mentioned slide holder 22.

A suitable light source means, indicated generally by the reference numeral 238, contains the usual projection lamp, cooling fan and light condensers. Postioned on the opposite side from the light source 238 is a projection optics assembly indicated generally by the reference numeral 240. The projection optics assembly 240 contains conventional optical elements which rotate the image of a normally oriented slide 24A through 180° to provide a naturally oriented image of the slide at an image plane.

It will be appreciated from an inspection of FIG. 12 that any one of the slides 24 stored in natural orientation in slide holder 22 can be positioned within the field of view of the projection optics assembly 240 by suitable movement of the vertically movable tray 232 and/or the horizontally movable slide holder support 236.

Figures 13, 14:
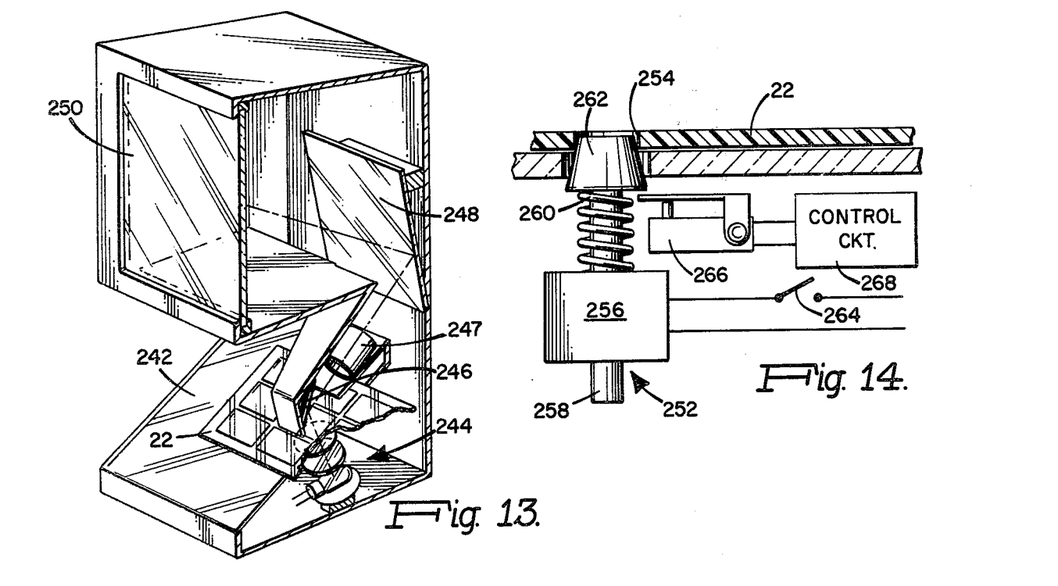

FIG. 13 shows another embodiment of the slide previewing and projection system of the present invention in which the slide holder 22 is movably supported on a light transmitting preview panel 242. A suitable light source and optical means, indicated generally by the reference numeral 244, is positioned below the preview panel 242 to provide illumination for previewing the slides and projection of a selected slide within slide holder 22. Mirror 246, image errecting element 247 and mirror 248 are employed to provide an enlarged image of the slide on a rear projection screen 250. Thus, by moving the slide holder 22 on the preview panel 242 until the desired slide is imaged on the screen 250, the operator can view the slides in a predetermined or random sequence.

FIG. 14 illustrates in partial block form and section a solenoid actuated locator, indicated generally by the reference numeral 252, for locating the co-planar slide holder 22 with respect to the optical path 72 of the embodiment shown in FIG. 1. Referring back for a moment to FIG. 6, it can be seen that the slide holder 22 is provided with a plurality of apertures 254 that are accurately located at the intersections between the slide pockets 32 and along the marginal edges of the slide holder at the corners of each of the pockets 32.

The slide holder apertures 254 cooperate with the spring-loaded solenoid locator shown in FIG. 14. The locator comprises solenoid 256 which has a movable plunger 258 that is spring-loaded by means of spring 260. A truncated conical locator pin 262 is secured to one end of the solenoid plunger for releasable engagement within the slide holder aperture 254. Solenoid 256 is energized from a suitable power source (not shown) through a control switch 264 which is manually actuated by the operator.

Preferably, a microswitch 266 and control circuit 268 are provided to control the energization of the lamp shutter solenoid 62. Thus, when the operator presses switch 264, the soldenoid plunger retracts thereby lowering locator pin 262 from engagement with the slide holder 22 and actuating the microswitch 266. The microswitch control circuit 268 then energizes the lamp shutter solenoid to block the light from the projection area 56 while at the same time continuing to provide illumination for the slides in the slide previewing area. When the slide holder has been moved by the operator to the next slide, the switch 264 is opened to de-energize the solenoid. This spring-loaded plunger then moves upwardly (as viewed in FIG. 14) causing the tapered locator pin 262 to energize with the slide holder and accurately position the holder with respect to the optical path 72.

Having described in detail preferred embodiments of my invention, it will now be apparent to those skilled in the art that numerous modifications can be made therein without departing from the scope of the invention as defined in the appended claims.

What we claim and desire to secure by Letters Patent of the United States is:

1. A transparency projection system for projecting transparencies that are stored in spaced, co-planar relation in a light transmitting, planar holder without removing the transparencies from the holder, comprising in combination:
   a. a planar slide holder having a plurality of spaced, co-plannar slide positions with means at each of said slide positions for holding a slide;
   b. optical means for forming a naturally oriented image at an image plane of an object at an object plane, said optical means including an optical apparatus for directing a light beam from a first axial path to a second axial path which is substantially normal to the first axial path, said second axial path being rotatable about the first axial path, said optical apparatus comprising:
      (1) a circular track centered about and transverse to said first axial path;
      (2) a head arranged for rotating on said track and about first axial path;
      (3) a first mirror fixed within said head for rotation thereby, said first mirror being oriented for substantialy right angle deflection of the light beam from the first axial path to an axial path transverse thereto;
      (4) second and third substantially right angularly deflecting mirrors;
      (5) means for mounting said second and third mirrors within said head for rotation about said transverse axial path with the transverse axial path intersecting said second mirror and with said second axial path intersecting said third mirror; and,
      (6) means for gearing said second and third mirror mounting means to said circular track for rotation of said second and third mirrors with and at half the angular rate of rotation of said head;
   c. means for supporting the transparency holder at the object plane;
   d. means for relatively moving the transparency holder with respect to the optical axis of said image forming means; and,
   e. light source means for illuminating at least a portion of the object plane positioned transparency holder so that at least one of the transparencies stored therein can be imaged by said image forming means.

2. The apparatus of claim 1 wherein said light source means illuminates a plurality of transparencies stored in the holder for direct group previewing in natural orientation while one transparency is imaged by said image forming means.

3. The apparatus of claim 1 wherein said means for relatively moving the transparency holder includes means for incrementally moving the holder in orthogonal directions.

4. The projector of claim 1 wherein said light source means illuminates a plurality of tansparencies stored in the holder for direct group previewing in natural orientation while one transparency is imaged by said image forming means.

5. The projector of claim 1 wherein said image plane is substantially normal to said object plane.

6. The projector of claim 5 wherein said image plane is substantially vertical and said object plane is substantially horizontal.

7. The projector of claim 1 wherein said image and object planes are substantially vertical.

8. The projector of claim 1 wherein said incrementally orthogonal moving means includes X-Y indexing means for relatively moving the holder to a selected X-Y address.

9. The projector of claim 1 wherein said transparency holder includes indexing means and wherein said apparatus further comprises means cooperative with the indexing means of the holder and said means for moving the holder with respect to the optical axis of the image forming means for indexing a preselected transparency to a predetermined location with respect to said optical axis.

10. The projector of claim 9 further includes means for terminating illumination to said at least a portion of the object plane positioned transparency holder during movement of the holder by said moving means.

11. The transparency projection system of claim 1 wherein said light source means includes means for illuminating another portion of the object plane positioned holder so that at least one of the transparencies stored therein can be previewed directly in natural orientation when the projector is positioned between an operator and the image plane with the operator and projector located along a line in a plane that intersects the image plane substantially normal thereto while said one transparency is imaged by said image forming means.

12. A transparency projection system for projecting transparencies that are stored in spaced, co-planar relation in a light transmitting, planar holder without removing the transparencies from the holder, comprising in combination:
   a. a planar slide holder having a plurality of spaced, co-planar slide positions each having a plurality of corners with means at each of said slide positions for holding a slide and at least one generally circular aperture located adjacent to at least one corner of each of said slide positions;
   b. optical means for forming an image at an image plane of an object at an object plane;
   c. means for supporting the slide holder at the object plane;
   d. means for orthogonally moving the slide holder relative to the optical axis of said image forming means, said means including a retractable, generally truncated, conical member adopted for engagement and disengagement with the generally circular aperture in said slide holder for positioning the slide holder with respect to the optical axis of the image forming means; and,
   e. light source means for illuminating (i) at least a portion of the object plane positioned holder so that at least one of the transparencies stored therein can be imaged by said image forming means and, (ii) another portion of the object plane positioned slide holder so that at least one of the transparencies stored therein can be previewed directly when the projector is positioned between an operator and the image plane with the operator and projector located along a line in a plane that interesects the image plane substantially normal thereto while said one transparency is imaged by said image forming means.

13. The projection system of claim 12 wherein the slide holder includes means cooperatively operative with said light source means.

14. An optical apparatus for directing a light beam from a first axial path to a second axial path which is substantially normal to the first axial path, said second axial path being rotatable about the first axial path, said optical apparatus comprising:
  a. a circular track centered about and transverse to said first axial path;
  b. a head arranged for rotating on said track and about said first axial path;
  c. a first mirror fixed within said head for rotation thereby, said first mirror being oriented for substantially right angle deflection of the light beam from the first axial path to an axial path transverse thereto;
  d. second and third substantially right angularly deflecting mirrors;
  e. means for mounting said second and third mirrors within said head for rotation about said transverse axial path with the transverse axial path intersecting said second mirror and with said second axial path intersecting said third mirror; and,
  f. means for gearing said second and third mirror mounting means to said circular track for rotation of said second and third mirrors with and at half the angular rate of rotation of said head.

15. An optical apparatus for directing a light beam along an optical path having at least a first segment, a second segment, a transverse segment and an intermediate segment, said second segment being substantially normal to the first segment and rotatable about the first segment, said optical apparatus comprising:
  a. a circular track centered about and transverse to said first segment of the optical path;
  b. a head arranged for rotating on said track and about said first segment of the optical path;
  c. a first mirror fixed within said head for rotation thereby, said first mirror being oriented for substantially right angle deflection of the light beam from the first segment of the optical path to the transverse segment and from the transverse segment to the first segment of the optical path;
  d. second and third substantially right angularly deflecting mirrors;
  e. means for mounting said second and third mirrors within said head for rotation about said transverse segment of the optical path with the transverse segment intersecting said second mirror with said intermediate segment of the optical path intersecting said second and third mirrors and with said second segment of the optical path intersecting said third mirror; and,
  f. means for gearing said second and third mirror mounting means to said circular track for rotation of said second and third mirrors about the first segment of the optical path.

* * * * *